United States Patent

[11] 3,555,315

[72] Inventor William P. Hunsdorf
 P.O. Box 535, Riverview, Fla. 33569
[21] Appl. No. 7,592
[22] Filed Feb. 2, 1970
[45] Patented Jan. 12, 1971

[54] CONSTANT TORQUE ADJUSTABLE SPEED MOTOR
9 Claims, 3 Drawing Figs.

[52] U.S. Cl. .................................................. 310/67,
 310/231; 318/325
[51] Int. Cl. ...................................................... H02k 13/00
[50] Field of Search ............................................ 310/67,
 231, 238; 318/541, 325

[56] References Cited
UNITED STATES PATENTS
| | | | |
|---|---|---|---|
| 2,385,742 | 9/1945 | Tritt .............................. | 310/67 |
| 2,739,278 | 3/1956 | Blankenship ................. | 318/194 |
| 2,812,454 | 11/1957 | Buck ............................ | 310/46 |

*Primary Examiner*—D. X. Sliney
*Attorney*—Oberlin, Maky, Donnelly & Renner

ABSTRACT: A direct current constant torque adjustable speed motor having a stationary armature and revolving field structure, which through a self-propelled adjustable speed governor drives a revolving brush holder to produce magnetic field rotation in the armature. Iron windings are employed in both the armature and field to provide sufficient resistance to current and to minimize induced EMF's. The speed governor is of the centrifugal friction drum type and in two embodiments may be present or adjustable during motor rotation.

PATENTED JAN 12 1971
3,555,315
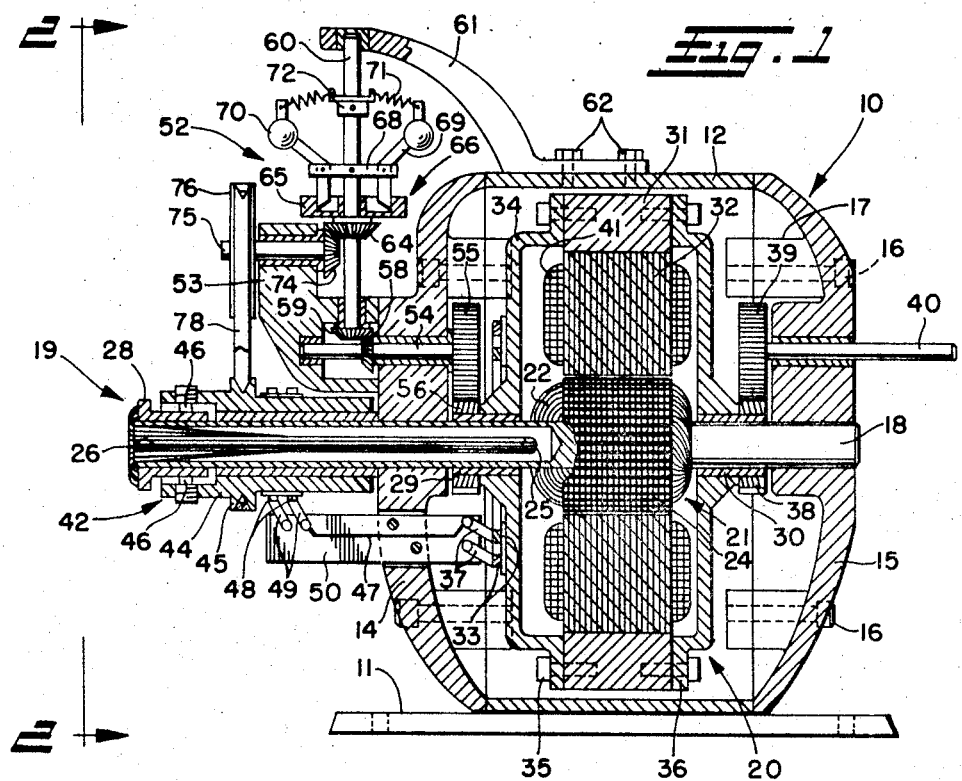
Fig.1
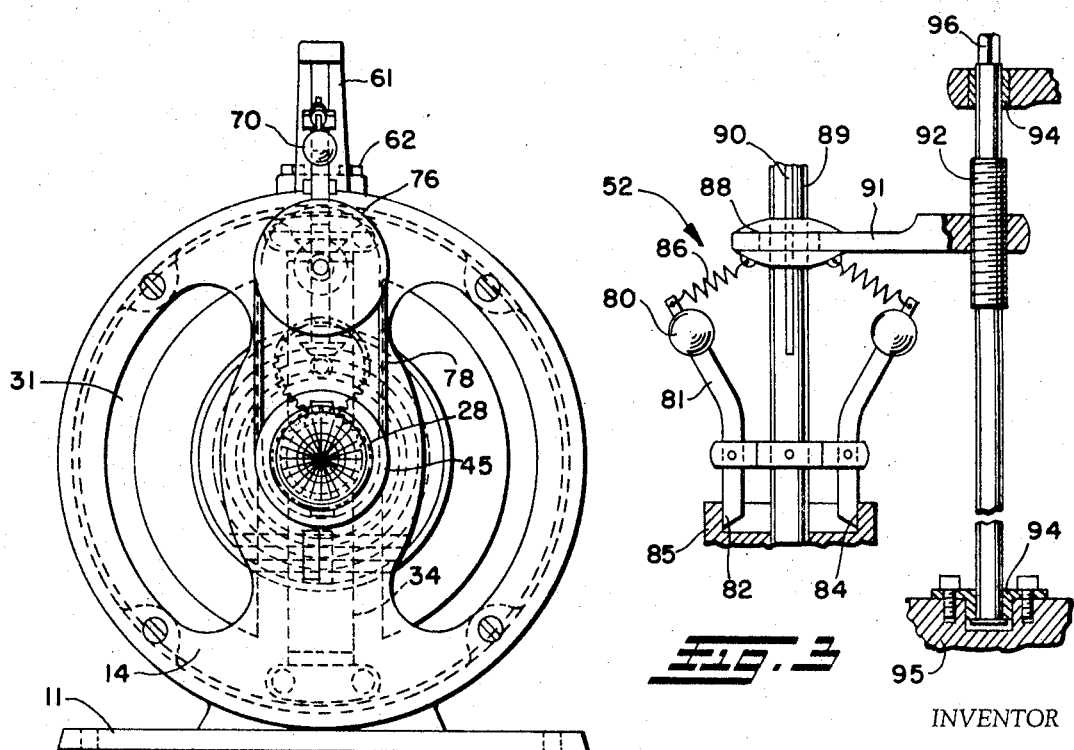
Fig.2
Fig.3
INVENTOR
WILLIAM P. HUNSDORF
BY
Oberlin, Maky, Donnelly & Renner
ATTORNEYS

CONSTANT TORQUE ADJUSTABLE SPEED MOTOR

This invention relates to electric motor mechanisms and more particularly to a novel configuration for DC electric motor which provides a relatively constant torque characteristic and an adjustable speed feature.

While the stationary field wound rotor types of electric motors have become commonplace in the art, most of these devices are designed for a particular application wherein a particular operating speed is desired or wherein a specific power output is realized at an optimum operating speed. With the advent of exotic control systems and the introduction of solid state components, for the most part control over motor speed and output torque characteristics have evolved into the electric control area wherein voltage control is utilized either on an amplitude or phase basis.

Little attention, however, has been directed recently to the mechanical approach to motor output control wherein similar effects can be achieved by modifying the relationship between magnetic fields produced in the field and armature structures. It is well known that phase shifting devices were employed in the early design of electric motors wherein the relative position between a brush assembly and an associated commutator structure could be varied by manual intervention. Other than in bringing a motor up to speed, however, these devices were primarily designed as present adjustments wherein a particular speed-torque characteristic could be obtained for any operating condition and could be altered under different loading conditions. It is not known, however, that automatic adjustment of such types of motor control devices was ever contemplated nor that the unique results to be obtained from such arrangement was visualized.

Therefore, it is one object of this invention to provide an improved direct current constant torque adjustable speed motor having a revolving field structure.

It is another object of this invention to provide an improved direct current motor which utilizes a self-propelled adjustable speed controller for developing a rotating magnetic field in the armature winding.

It is yet another object of this invention to provide an improved direct current motor having a constant torque characteristic and a running speed adjustment provided by a governor and slip clutch arrangement which varies armature energization as a function of speed of field rotation.

To the accomplishment of the foregoing and related ends, the invention, then, comprises the features hereinafter fully described, the following description and the annexed drawings setting forth in detail certain illustrative embodiments of the invention, these being indicative, however, of but a few of the various ways in which the principles of the invention may be employed.

In the drawings:

FIG. 1 is an elevational cross-sectional view of the apparatus of the invention showing a first embodiment of the self-propelled adjustable speed controller;

FIG. 2 is an end view of the apparatus of the invention; and

FIG. 3 is a partial elevational view of the apparatus of the invention showing the second embodiment of the adjustable speed controller.

Referring now to FIG. 1 and the cross-sectional view of the motor 10, there is shown a mounting plate 11 of generally rectangular configuration and rigidly supported thereon a cylindrical member 12 forming the main motor housing. At either end of the housing 12 are the front and rear end brackets 14, 15 which are retained in place by bolts 16 engaging bosses 17 secured to the housing 12. The brackets 14, 15 form the end bells for the motor 10 engaging the housing 12 at their periphery and adapted to support rotating and fixed shafts at the central portions thereof.

Extending axially and centrally through the motor housing 12 and fixedly supported in the front and rear end brackets 14, 15 is the main shaft 18 of the motor which extends outwardly from the front end bracket 14 for support of the commutator assembly 19. The main shaft 18 is nonrotatable, being frictionally supported in the front and rear end brackets 14, 15 and primarily serves as an arbor for the revolving field structure shown generally at 20.

The armature 21 of the motor is supported on the main shaft 18 centrally within the housing 12 and comprises multiple windings 22 extending generally axially of the motor 10 to provide a plural pole structure. The windings 22 are supported on a drum 24 of magnetically permeable material preferably of laminated construction and frictionally held in location on the main shaft 18. The front end of the main shaft 18 is bored to a point adjacent the drum 24 and has cross holes 25 drilled therein so that connecting wires 26 from the armature windings 22 may be brought to the forward end of the shaft 18 and the stationary commutator 28 mounted thereon.

Rotatably mounted on the main shaft 18 in first and second sleeve bearings 29, 30 is the revolving field structure 20 which comprises a generally annular member 31 having a pair of diametrically opposed and radially inwardly extending field pole pieces 32, the latter culminating in an arcuate surface closely adjacent the periphery of the armature drum 24. The field member 31 in turn is supported at the front end by a flanged diametrically extending bracket 34 which receives the forward support bearing 29 in a central aperture therein and which is secured to the field member 31 at the flanged end by means of bolts 35. A similar flanged bracket 36 is affixed to the field member 31 at the rearward end by means of bolts and receives the rear support bearing 30 to allow rotation on the main shaft 18. The rear field bracket 36 further includes a spur gear 38 fixedly mounted thereon which meshes with a second spur gear 39 affixed to a power takeoff shaft 40, in turn rotatably supported in the rear motor bracket 15 and above the main shaft 18 in a sleeve bearing.

The field structure 20 includes a continuous winding 41 supported on the pole pieces 32 and wound in a direction to provide opposite magnetic poles adjacent the armature 21 thereby producing magnetization in the gap interreaction the ends of the pole pieces and the armature drum 24. The windings in both the field and armature are made with insulated iron wire which provides a greater resistance to the flow of current than the conventional copper wire and which allows the windings to be connected directly across a source of power without excessive current flow even in the locked rotor condition. Further, the use of iron wire minimizes the effect of induced EMF's incurred upon rotation of the field structure 20 with respect to that of the armature 21 so as to provide minimum undesired interreaction therebetween.

The field structure 20 includes a pair of electrically conductive rings 33 concentrically and insulatively disposed on the forward face of field bracket 34 for energizing the field winding 41, connected at either end to the rings 33. A pair of brushes 37 bear against the rings 33 throughout their rotation to continuously conduct current from a direct current power source which energizes the motor 10.

A rotating magnetic field is set up in the armature windings 22 by means of the cooperation of a rotating brush holder 42 with the stationary commutator 28 mounted on the end of the main shaft 18. While it is evident that only a single pole armature is required to achieve a satisfactory running condition, it is recognized by those skilled in the art that a multiple winding in the armature 21 is desired to achieve a smoother running motor with a minimum of commutation problems. The revolving brush holder 42 comprises a sleeve 44 mounted in a sleeve bearing at the forward end of the main shaft 18 and outside the motor bracket 14. A pulley 45 is mounted on the sleeve 44 for providing impetus to the brush holder 42 which further includes a pair of brushes 46 at the forward portion thereof, which brushes 46 are retained for rotation with the sleeve 44 and which are biased against the commutator 28 for electrical connection therewith in the conventional manner.

The brush holder 44 also includes a pair of conductive rings 48 insulatively mounted on the sleeve 44 for applying the energizing power to the armature windings 22, said conductive rings 48 receiving energizing power from a pair of brushes 49 insulatively mounted on a support bracket 50 attached to the forward motor bracket 14 and energized from a source of power. It will be apparent that as the brush holder sleeve 44 undergoes rotation, succeeding segments of the stationary commutator 28 will be contacted by the brushes 46 to supply power to the various windings of the armature 21, thereby effecting a rotating magnetic field in the armature whose rate of rotation is directly proportional to the speed of rotation of the brush holder sleeve 44. Preferably brushes 37, 49 are in series connection with the source of DC power (not shown) for energizing the motor, as indicated by the wire connection 47 between one of each pair of brushes.

The means for supplying rotation to the brush holder sleeve 44 is indicated generally at 52 and comprises a self-propelled adjustable speed controller operating on the centrifugal clutch principle. A first axially extending shaft 54 is mounted in the forward end bracket 14 and in L-shaped support member 53 affixed to bracket 14 and overhanging the main shaft 18. A spur gear 55 is mounted at the rear portion of shaft 54 for cooperation with a spur gear 56 mounted on the flanged support member 34 of the revolving field structure 20. The shaft 54 is mounted for rotation in sleeve bearings and carries a bevel gear 58 near the midportion thereof which cooperates with a second bevel gear 59 mounted on a radially upwardly extending governor drive shaft 60.

The drive shaft 60 in turn, is mounted for rotation at one end in the support member 53 in a sleeve bearing and at the other end in a cup bearing carried in a support arm 61 located thereabove and rigidly attached to the motor housing 12 by means of bolts 62. Another bevel gear 64 is freely mounted on the governor shaft 60 for rotation with respect thereto and is fixed, for rotation therewith, to a cup-shaped flywheel 65 also journaled on shaft 60. The flywheel 65 includes a frictional bearing surface on the inner periphery of the cup forming a part of the clutch member 66. An axially extending bracket 68 is pinned to the governor shaft 60 near the central portion thereof for rotation therewith and supports at its outer extremities pivotally mounted lever arms 69 which cooperate with the flywheel 65 to provide a clutch action for the speed controller. The lever arms 69 include a dependent leg having a frictional contact surface at the outer radial portions thereof for cooperation with the flywheel 65 and an upwardly extending leg supporting the governor weights 70 which preferably are of a relatively massive material to provide suitable centrifugal action to the governor mechanism 52.

A pair of springs 71 are attached between the governor weights 70 and a spring support collar 72 which is retained on the governor shaft 60 for vertical adjustment by means of a set screw, which arrangement provides a control over the operating speed of the motor. As further indicated, the bevel gear 64 on the governor shaft 60 cooperates with a bevel gear 74 fixedly mounted on an axially extending shaft 75 rotatably supported in the member 53, the shaft 75 having a pulley 76 fixedly attached at the outboard end thereof with a flexible belt 78 coupling the pulley 76 with that pulley 45 mounted on the brush holder sleeve 44.

Thus, it will be apparent that as the field structure 20 undergoes rotation, its movement will be transmitted by way of the spur gears 55, 56 and shaft 54 to rotation of the governor weights 70. At low speeds of rotation, the governor weights 70 will be relatively closer to the governor shaft 60 under the influence of the springs 71 so that the frictional portion of arms 69 engage the cup-shaped flywheel 65 to deliver rotation of the drive pulley 76 by means of the bevel gears 64, 74. The drive pulley 76 in turn will transmit the rotation to the brush drive pulley 76 in turn will transmit the rotation to the brush holder sleeve 44 and cause rotation of the brushes 46 about the stationary commutator 28, sequentially energizing the various windings 22 of the armature structure 21. Such energization of the armature windings 22 will create a rotating magnetic field in the armature 21 which will cooperate with the rotatable field structure magnetic pole to impart rotation to the field structure 20 and thus provide torque to the output shaft 40, coupled by means of the spur gears 38, 39.

As the field structure 20 approaches and reaches the normal operating speed, the governor weights 70 will be urged outwardly against the action of the springs 71 by means of centrifugal force, pivoting the frictional portion of the lever arms 69 away from the flywheel 65, thereby interrupting the drive to the brush holder sleeve 44. The sleeve 44 will continue to rotate due to the inertial effect of its mass but will slow somewhat causing a corresponding effect upon the speed of the field structure 20, maintaining, however, the constant torque output of the motor. A slight slow down of the field structure 20, of course, is in turn transmitted to the governor mechanism 52 reducing the centrifugal force and causing a collapse of the weights 70 and arms 69 under influence of the springs 71, thereby urging the arms 69 into engagement with the flywheel 65 and again driving the brush holder sleeve 44. It will be apparent that there is some hunting in the action of the motor about the nominal operating speed wherein the lever arms 69 are alternately engaged and disengaged from the flywheel 65. As mentioned, the spring support collar 72 is adjustably mounted and may be elevated or lowered on the governor shaft 60 so as to vary the tension in the springs 71 and thus the speed of rotation of the motor at which the lever arms 69 disengage from the flywheel 65.

Referring now to FIG. 3, there is shown a second embodiment of the governor mechanism 52 for providing an adjustment of the speed of rotation during operation of the motor. Here a similar type governor weight 80 and arm structure 81 is utilized, the latter having the frictional portions 82 which cooperate with the inner periphery 84 of the flywheel 85. However, in this arrangement, the pair of springs 86 are connected between the governor weights 80 and a spring support collar 88 which is mounted on and keyed for rotation with governor shaft 89 by means of a key and keyway 90 arrangement and which is free to slide in a vertical direction. A shifter fork 91 entraps the spring support collar 88 and in turn is adjustably supported on a threaded shaft 92 vertically oriented in a pair of bearings 94 fixed in relation to the motor housing 95. The shaft 92 is free to rotate in the bearings but is restricted from vertical movement and upon rotative adjustment thereof by means of the squared upper end 96 imparts a vertical movement to the shifter fork 91 and thus to the spring support collar 88 varying the tension in the pair of springs 86 and thus the nominal speed of rotation of the motor.

I claim:

1. A direct current constant torque adjustable speed motor comprising a main support shaft, a drum armature fixedly mounted on said shaft, a winding on said armature for establishing a magnetic field with respect thereto, a field structure rotatably mounted on said shaft for magnetic cooperation with said armature, a winding on said field structure for establishing a magnetic field with respect thereto, means for energizing said field winding from a source of power, a commutator fixedly mounted on said shaft and electrically connected with said armature winding, a pair of brushes rotatably supported on said shaft for sliding engagement with said commutator, said brush adapted to receive electrical energy from a source of power, means coupling said field structure with said brushes to impart rotation thereto, and means for interrupting said coupling means when said field structure attains a predetermined speed of rotation.

2. A motor as set forth in claim 1 wherein said interrupting means comprises a centrifugal clutch for engaging and disengaging said coupling means below and above, respectively, the predetermined speed of rotation.

3. A motor as set forth in claim 2 wherein said clutch comprises a centrifugal weight mechanism, a friction shoe actuated thereby, a flywheel engageable by said friction shoe, and means for adjusting the actuating point of said weight mechanism.

4. A motor as set forth in claim 3 wherein said adjusting means comprises a support member and a spring mounted between said support member and said weight mechanism, said support member being adjustable relative to said weight mechanism for varying the tension in said spring.

5. A motor as set forth in claim 4 wherein said support member is rotatable with said weight mechanism and further including a lifter fork in engagement with said support member, said lifter fork being linearly adjustable relative to said weight mechanism.

6. A motor as set forth in claim 1 wherein said armature winding comprises a plurality of coils axially wound on said armature and having circumferentially spaced magnetic poles, said commutator having a corresponding member of segments thereon for individually energizing said coils.

7. A motor as set forth in claim 6 wherein said field structure comprises an annular member supported for rotation on said main shaft, and a pair of radial inwardly directed pole pieces supported on said annular member, said field winding being circumferentially wound on said pole pieces to provide a radial magnetic pole.

8. A motor as set forth in claim 7 wherein said means for energizing said field winding comprises a pair of concentric conductive rings supported for rotation with said field structure, said rings being electrically connected with said field winding, and a pair of brushes energized from a source of power, adapted to engage said rings throughout rotation of said field structure.

9. A motor as set forth in claim 8 wherein said armature brushes and said field brushes are electrically interconnected for series energization from a source of electrical power, and said windings are iron wire windings having a relatively high resistance value.